No. 823,944. PATENTED JUNE 19, 1906.
H. C. HART.
SHAFT COUPLING.
APPLICATION FILED SEPT. 23, 1905.
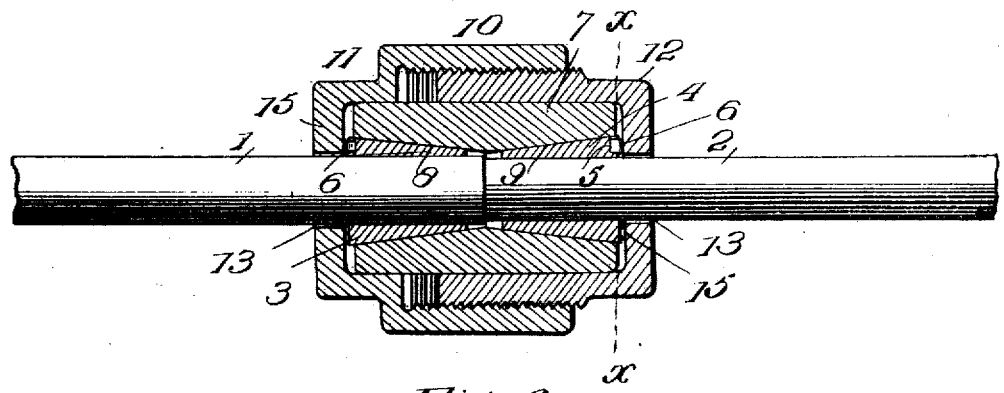
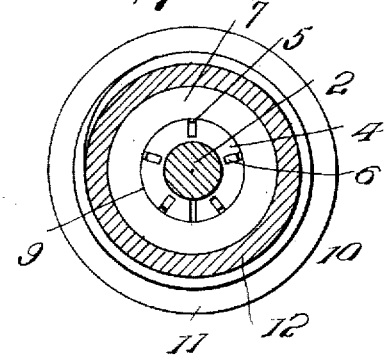
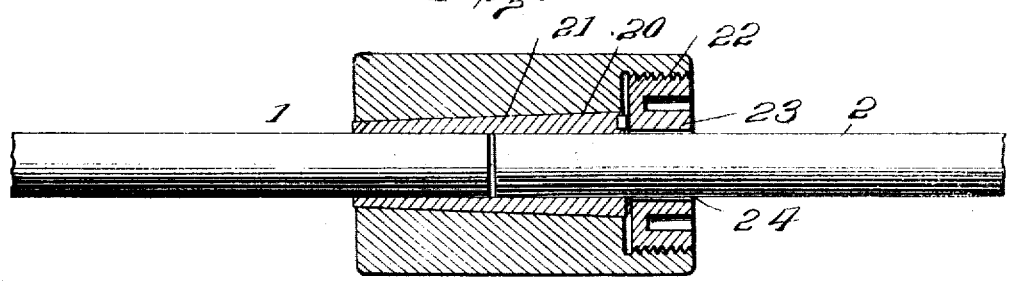
Witnesses
Inventor
H. C. Hart

UNITED STATES PATENT OFFICE.

HUBERT C. HART, OF UNIONVILLE, CONNECTICUT.

SHAFT-COUPLING.

No. 823,944.  Specification of Letters Patent.  Patented June 19, 1906.

Application filed September 23, 1905. Serial No. 279,822.

*To all whom it may concern:*

Be it known that I, HUBERT C. HART, a citizen of the United States, residing at Unionville, in the county of Hartford and State of Connecticut, have invented new and useful Improvements in Shaft-Couplings, of which the following is a specification.

This invention relates to improvements in shaft-couplings.

In all shaft-couplings known to me where a split sleeve is employed the latter is not made effective by directly forcing it into its seat, but by clamping the same to compress it on the ends of the shafts.

According to my invention I employ a collar having two oppositely-formed beveled seats to receive split cones and a binding element composed of two parts screwed together and engaging the split cones to force the same in their seats to compress them on the adjacent ends of the shafts to be coupled.

Other objects and advantages will be hereinafter referred to, and particularly pointed out in the claims.

In the drawings, Figure 1 is a central vertical section of my preferred form of shaft-coupling. Fig. 2 is a transverse section of the same on the line $x$ $x$, Fig. 1. Fig. 3 is a central vertical section of a simpler form of my invention.

The same numerals refer to like parts in all the figures.

1 and 2 indicate shafts, and, as shown in Fig. 1, one is slightly larger than the other. On the shafts 1 and 2 are mounted conical split sleeves 3 and 4, having bearings 5 formed in their ends to receive antifriction-rollers 6. The conical sleeves are inserted in the opposite ends of a collar 7, formed with an oppositely-tapered opening, the tapers being indicated at 8 and 9.

10 indicates a binding element composed of two sections 11 and 12, each section being formed with an opening 13 for the passage of a shaft. Section 12 is exteriorly threaded to enable me to draw the sections together to make the conical sleeves effective.

In operation the parts are assembled on the shafts, as clearly shown in Fig. 1, whereupon the two sections of the binding element are screwed together and the shoulders 15 thereof abut against the antifriction-rollers and force the two sleeves toward each other. When the sleeves are thus operated upon, they are closed by the tapered portions 8 and 9 of the opening in the collar. The antifriction-rollers greatly assist in relieving the friction between the shoulders of the sections and the sleeves, as will be readily understood.

By forcing the sleeves in direct alinement with the shafts the power necessary to grip said shafts is necessarily greatly reduced, and by providing two conical sleeves shafts of different diameters can very readily be coupled together.

Another important feature of my invention resides in the peculiar relationship between the diameter of the collar and the interior diameter of the sections 11 and 12—that is to say, in a shaft-coupling of this type the collar is liable to become broken, due to the outward strain of the conical sleeves, and to overcome this difficulty the interior of the sections is made to snugly fit the exterior of the collar, which prevents the expansion of the latter should a flaw occur in the metal. In the construction shown in Fig. 3 I have shown the collar with a single tapered opening 20 and conical split sleeve 21. The inner end of the collar is threaded, as shown at 22, to receive a nut 23, formed with an opening 24 for the passage of the shaft 2. This structure is admirably adapted for light work and is free of projections when assembled. However, the same characteristics mentioned in connection with the preferred form is present in this device.

By constructing a shaft-coupling as described I dispense entirely with the use of bolts or unnecessary extensions, a feature of vital importance from a practical standpoint. Factory inspectors insist on shaft-couplings using bolts or other connecting devices projecting out from the coupling being covered or protected to avoid catching in the clothes of the operators or picking up belting or the like.

What I claim is—

1. In a shaft-coupling, the combination with a collar and means coöperating therewith to hold the ends of shafts, means for forcing the coöperating means to engage the shafts and locking the same in position and antifriction devices intermediate the forcing means and the coöperating means.

2. In a shaft-coupling, the combination with a pair of split sleeves, of an element having tapered seats to receive the sleeves, a binding element to simultaneously act on the outer ends of the two sleeves to force the latter into their seats in line with the connected shafts, and antifriction devices, interposed between the binding element and the sleeves.

3. In a shaft-coupling, the combination with a collar formed with an opening, tapering in two opposite directions, of two tapering split sleeves fitting in the opening, a binding element formed in two sections, each section being threaded and engaging each other to draw the sections together, each section having an integral annular shoulder to engage the outer ends of the split sleeves to force the same together in alinement with the shafts being coupled, when the two sections of the binding element are screwed together.

In testimony whereof I affix my signature in presence of two subscribing witnesses.

HUBERT C. HART.

Witnesses:
 JNO. IMIRIE,
 A. H. BENNETT.